United States Patent [19]
Hofer

[11] Patent Number: 5,474,029
[45] Date of Patent: Dec. 12, 1995

[54] ANIMAL WATERING APPARATUS

[75] Inventor: George K. Hofer, Barons, Canada

[73] Assignee: Hutterian Brethren Church of Whitelake, Barons, Canada

[21] Appl. No.: 77,100

[22] Filed: Jun. 16, 1993

[51] Int. Cl.⁶ .................................................. A01K 7/00
[52] U.S. Cl. ................................................... 119/73
[58] Field of Search ................. 119/73, 74, 75, 119/78

[56]  References Cited

U.S. PATENT DOCUMENTS

| | | | |
|---|---|---|---|
| 1,576,218 | 3/1926 | Powell | 119/73 |
| 1,633,150 | 6/1927 | Wieben | 119/73 |
| 1,786,049 | 12/1930 | Zoeller | 119/73 |
| 2,087,173 | 7/1937 | Uden | 119/73 |
| 2,252,623 | 8/1941 | Gerken | 119/73 |
| 3,943,889 | 3/1976 | Sparber | 119/73 |
| 3,949,707 | 4/1976 | Armstrong et al. | 119/73 |
| 4,218,607 | 8/1980 | Noland | 219/301 |
| 4,248,177 | 2/1981 | Peterson et al. | 119/73 |
| 4,320,720 | 3/1982 | Streed | 119/73 |
| 4,440,112 | 4/1984 | Lilyerd | 119/78 X |
| 4,584,966 | 4/1986 | Moore | 119/73 |
| 4,646,687 | 3/1987 | Peterson et al. | 119/73 |
| 4,704,991 | 11/1987 | Moore | 119/73 |
| 4,708,091 | 11/1987 | Schafer | 119/73 |
| 4,813,378 | 3/1989 | Lapp | 119/73 |
| 4,922,858 | 5/1990 | Ahrens | 119/73 |
| 4,930,572 | 6/1990 | Doshier | 165/45 |
| 4,953,507 | 9/1990 | Robinson | 119/73 |
| 5,003,928 | 4/1991 | Ketterlin et al. | 119/73 |
| 5,146,873 | 9/1992 | Gray | 119/73 |

FOREIGN PATENT DOCUMENTS

| | | | |
|---|---|---|---|
| 1154640 | 10/1983 | Canada | 119/42 |

Primary Examiner—Gene Mancene
Assistant Examiner—Thomas Price
Attorney, Agent, or Firm—John R. Uren

[57]  ABSTRACT

An animal watering apparatus has a centrally located cylindrical casing extending vertically downwardly in the ground with the surface of the water in the casing being located generally at ground level. A liquid level device or regulator is located below the surface of the water in the casing so as to not be susceptible to freezing. A water supply line is located below the frost line of the ground and provides water to the liquid level device in the central casing. A second casing is positioned in the ground and is connected to the central casing at the bottom of both casings such that the water supply to the central casing is also supplied to the second casing. Insulation surrounds substantially the length of the first and second casings. The liquid level device may be readily removed from the central casing from the ground surface so as to service the liquid level device and its associated tubing.

17 Claims, 4 Drawing Sheets

ANIMAL WATERING APPARATUS

INTRODUCTION

This invention relates to an animal watering apparatus and, more particular, to an animal watering device which resists freezing in cold weather.

BACKGROUND OF THE INVENTION

There are many animal watering devices which are in use at the present time. One disadvantage inherent in most of these watering devices is the fact that they will freeze over in the winter thus denying the animal access to water and necessitating a visit by the farmer in order to break through the ice and allow access to the water by the animal. In particularly cold weather, it may be necessary to make several visits per day and, of course, it is important to the health of the livestock that water be available when so desired.

Several proposals have been made to prevent the ice formation on watering apparatuses in the winter. One such proposal, contained in several publications but particularly described in U.S. Pat. No. 5,146,873 (Gray), allows for an electrical heating element to be positioned in the water compartment in order to heat the water and thus prevent ice formation. However, the use of electrical power to heat the element is not always possible due to the distance the animals may be located from a source of electricity. In addition, electricity near water, particularly where power is needed in the order of that required to heat the heating element, can be dangerous to the animals and, of course, electricity is expensive.

A second proposal, as contained in U.S. Pat. No. 4,440,112 (Lilyerd), includes a device to provide turbulence in the water within the water compartment, the turbulence thereby preventing the formation of ice. A device to produce turbulence, however, requires a source of power. The use of electricity to produce the turbulence has the same disadvantages described above in respect of the Gray patent and in the event the turbulence is to be produced by the supply of water, it necessitates continuous running of the water which could overflow the reservoir or, in any event, is needlessly wasteful.

An open top portion to allow access by an animal to water in the reservoir is described in U.S. Pat. No. 5,003,928. In this patent, an insulated and buoyant disk is utilised which floats in the water and which allows access by the animal to the water in the reservoir around the outside of the disk. While this reference may have some advantages and may, indeed, hinder the ice formation, its disadvantages to the watering animal are apparent.

SUMMARY OF THE INVENTION

According to one aspect of the invention, there is provided an animal watering apparatus comprising a first cylindrical casing, a second cylindrical casing, said first and second casings being interconnected so as to allow water to circulate between said first and second cylindrical casings, a water supply pipe to supply water to said first cylindrical casing, a regulator to regulate water admitted from said water supply pipe to said first cylindrical casing and insulation surrounding a substantial portion of the length of said first and second cylindrical casings and being adapted to extend below the frost line of the ground in which it is positioned, said regulator being located within said first cylindrical casing.

According to a further aspect of the invention, there is provided an animal watering apparatus comprising a first cylindrical casing, insulation surrounding said first cylindrical casing, a liquid level control and associated piping located in said first cylindrical casing, a fitting operable to be connected to a water supply line which supply line is located below the frost line of the ground in which the water supply line is located and means to adjust the vertical position of said liquid level control within said first cylindrical casing.

According to yet a further aspect of the invention, there is provided an animal watering apparatus comprising a liquid level regulator, tubing associated with said regulator, a connector associated with said regulator and tubing to connect said liquid level regulator to a water supply line, said connector including a collar adapted to be slidably inserted in a bracket associated with said water supply line, said liquid level regulator being adapted to be inserted within and removed from a casing which is located below the ground surface, said liquid level regulator being adapted be located below the surface of the water in said casing when said casing is in its operating configuration.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1:
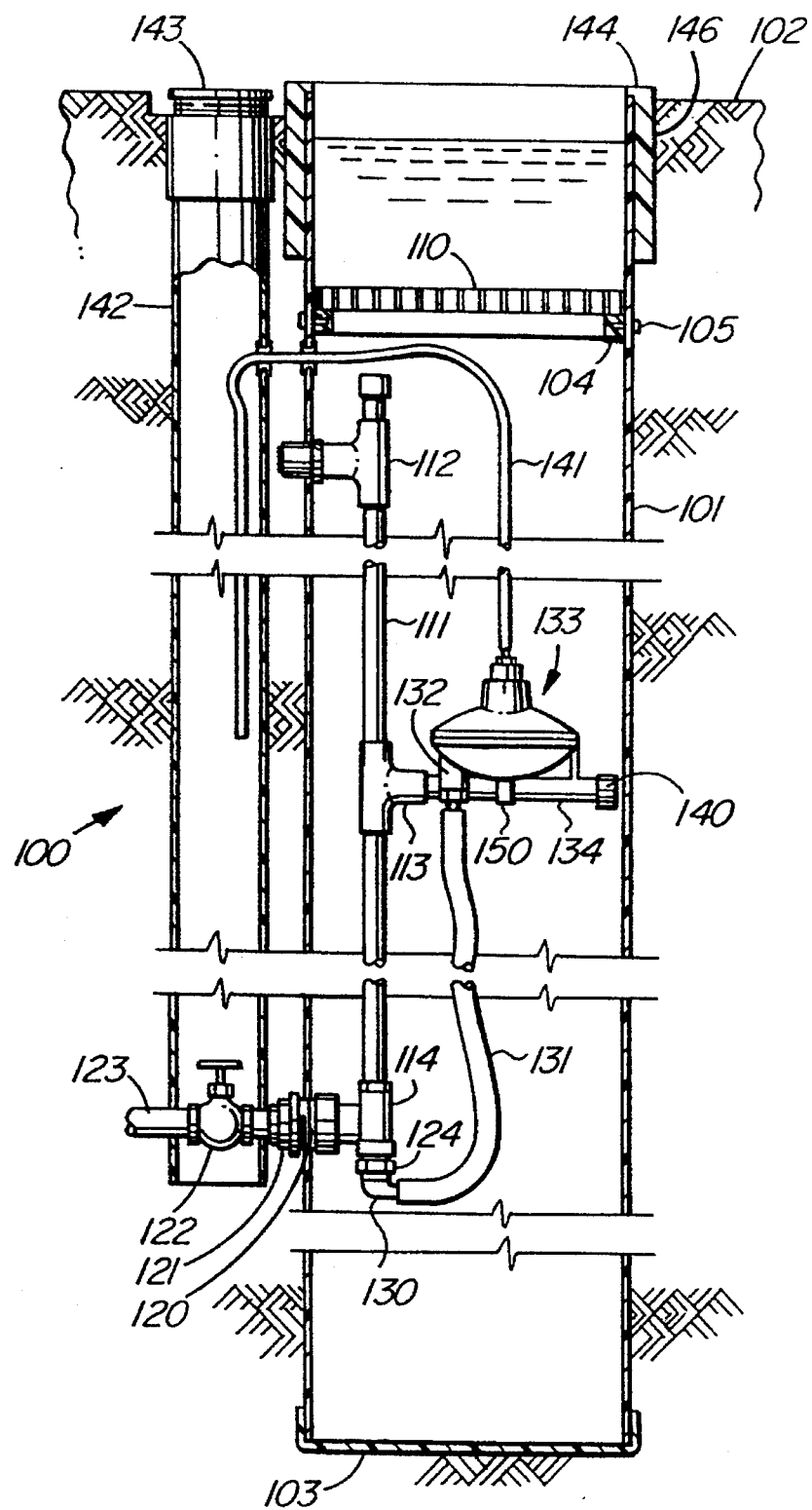
FIG. 1 is a side diagrammatic partially sectional view of a animal watering apparatus according to one aspect of the invention.

With reference now to the drawings, an animal watering apparatus according to the invention is illustrated generally at 100 in FIG. 1. The watering device comprises a cylinder or casing 101 extending vertically downwardly from the ground surface 102 and which is constructed from a PVC plastic material. An end cap 103 is mounted on the lower end of the casing 101 in order to close the bottom of the cylinder. A plastic support ring 104 is held in place around the inside circumference of the casing 101 by stainless steel fasteners 105 and a safety grate 110 is mounted on the plastic support ring 104 in order to prevent accidental entry to the inside of the casing 101 when it is filled with water.

A ¾ inch PVC 111 pipe extends parallel to the axis of casing 101 from a snap tee 112 which is connected to the casing 101 to a second snap tee 113 and, thence, to an adaptor 114 located in the bottom end of the casing 101. Adaptor 114 extends through the wall of casing 101 and has a threaded connection 120 and a collar 121 which is adapted to be connected to a shut off valve 122 which, in turn, is connected to a water supply line 123 located below the frost line of the ground in which it is buried. A bushing 124 is connected to the adaptor 114 and an elbow 130 is mounted on bushing 124. A flexible hose 131 extends from the elbow 130 to the inlet 132 of a fluid level control or regulator generally illustrated at 133. Fluid level control 133 is mounted on PVC pipe 134 which extends outwardly from and is connected to snap tee 113 slidably mounted on pipe 111. The slidable snap tee 113 allows vertical adjustment of the level control 133 within the casing 101 on pipe 111 so that the liquid level control 133 may take a position to give the desired level of water in the casing 101. An end cap 140 is mounted on the PVC pipe 134.

A second flex hose is used as a vent tube 141 and extends upwardly from the fluid level control 133, through the casing 101 and into cylindrical PVC tube 142 where it then extends downwardly. Tube 142 is positioned outside of casing 101 and extends from the ground surface 102 downwardly over the water supply line 123 so as to center the shut off valve 122 in the tube 142 and therefore allow access to the shut off valve 122 from the ground surface 102 by removing an end plug 143 which is threaded into and closes tube 142 and by inserting a longitudinal type tool (not illustrated) as is known. A urethane insulating cap 144 is mounted around the top outside circumference of the cylinder or casing 101 and serves to insulate the casing 101 from the surrounding earth. Urethane foam 145 is also provided outside the insulating cap 144 and a polyethylene film 146 surrounds the outside circumference of the insulating cap 144.

OPERATION

In operation, an excavation will be created in which to mount the animal watering apparatus 100. The fluid level control and its associated plumbing will be preassembled and flex hose 141 will extend outwardly from the wall of the casing 101. The water supply line 123 will be in the appropriate position below the frost line of the ground and the shut off valve 122 will be connected to the water supply line 123. Threaded connection 120 and collar 121 connected thereto will extend from the outside circumference of casing 101 and collar 121 will be connected to the water supply line 123 downstream of the shut off valve 122 when the casing 101 is placed in the appropriate position. The urethane insulating cap 144 will be mounted about the casing 101 and tube 142 will be placed in position over shut off valve 122. After the watering apparatus 100 is placed in the appropriate position, the excavation is refilled with earth surrounding the casing 101 and the tube 142.

The end plug 143 is removed from tube 142 and the shut off valve 122 is opened thereby to allow water to flow from the water supply line 123 through adapter 114 and flexible hose 131 to the fluid level control or regulator 133.

The fluid level control 133 is a pressure operated control; that is, when the pressure head above the fluid level control 133 is of a predetermined height, the fluid level control 133 will terminate flow from the flexible hose 131. The fluid level control 133 allows water to leave exit 150 and fill the casing 101 until the predetermined height of water in the casing is reached, which height is generally approximately half way between the ground surface 102 and the safety grate 110 as illustrated in FIG. 1. The fluid level control 133 may be moved up and down on tubing 111 until the correct position is reached to give the water surface its correct location.

The earth surrounding the casing 101 acts as a heat sink and allows heat to be transferred to the water in the water supply line 123 from the ground. The water supply line 123 is located below the frost line of the earth surrounding the casing 101 and the fluid level control 133 and flexible hose 131 are mounted below the surface of the water in the casing 101. As the water is taken from the watering device 100 by the watering animal, the fluid level control 133 will sense the decrease in height of the surface of the water and allow water to leave the water fluid device 133 to thereby replenish the liquid in the casing 101. The water received from the water supply line 123 will be maintained in the casing 101 at its elevated temperature relative to the ambient temperature in the winter by the insulating effect of the ground surrounding the casing 101 and the insulation 144 mounted about the upper circumference of casing 101.

If it is desired to terminate or shut down the animal watering device 100, the end plug 143 is removed and the shut off valve 122 is closed thereby to terminate the water supply to the animal watering device 100.

Figure 2A:
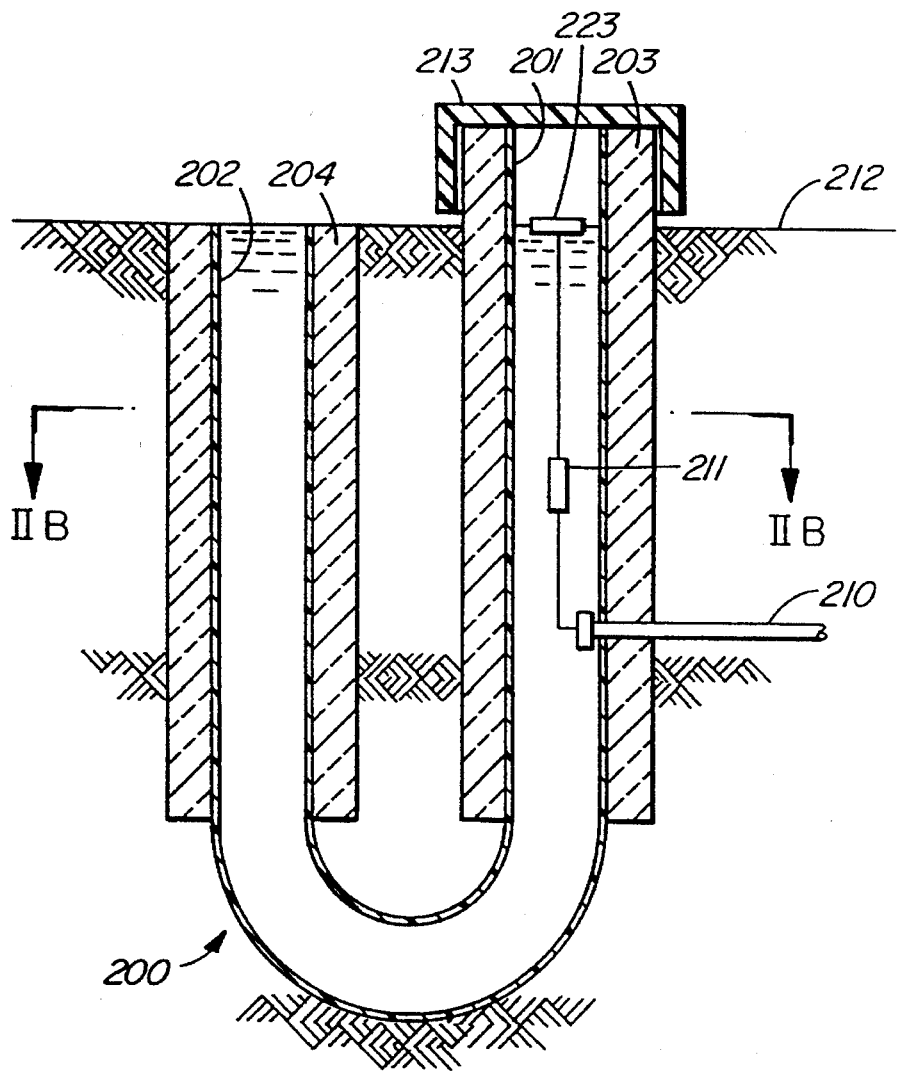
FIG. 2A is a diagrammatic sectional view of an animal watering apparatus according to a further aspect of the invention.
Figure 2B:
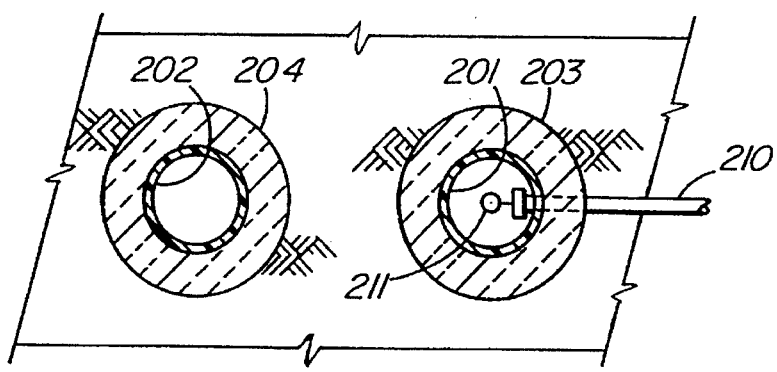
FIG. 2B is a sectional view taken along IIB—IIB of FIG. 2A.

A further embodiment of the invention is illustrated diagrammatically in FIGS. 2A and 2B. In this embodiment, the animal watering device is generally illustrated at 200 and comprises separately located and parallel first and second casings 201, 202, respectively. A first insulation layer 203 surrounds substantially the entire length of the casing 201 about its circumference and a second insulation layer 204 surrounds the same distance of the circumference of casing 202 as is illustrated. The bottom of casing 201 is connected to the bottom of casing 202 as is illustrated.

A water supply line 210 is mounted in the earth below the frost line of the ground. An excavation is again made and the casing 201 is connected to casing 202. The water supply line 210 is connected to the fluid level control 211 in the same manner as that described in connection with the FIG. 1 embodiment and a shut off valve (not shown) exists in the water supply line 210 and is accessible from the ground surface 212 in the same manner as that described in the FIG. 1 embodiment. The casing 201 and the attached insulation 203 extend above the ground surface 212 as illustrated and a polyethylene end cap 213 will be mounted on the top of the casing 201 and insulation 203 to thereby close the top surface and keep the water liquid while allowing ventilation of the head above the surface of the liquid to the atmosphere. A float 223 is connected to the liquid level control 211 and operates to connect the liquid level control 211 to terminate or initiate water supply to the casing 201.

Animals wishing to drink from the animal watering device 200 will drink from the ground surface of casing 202.

Figure 3:
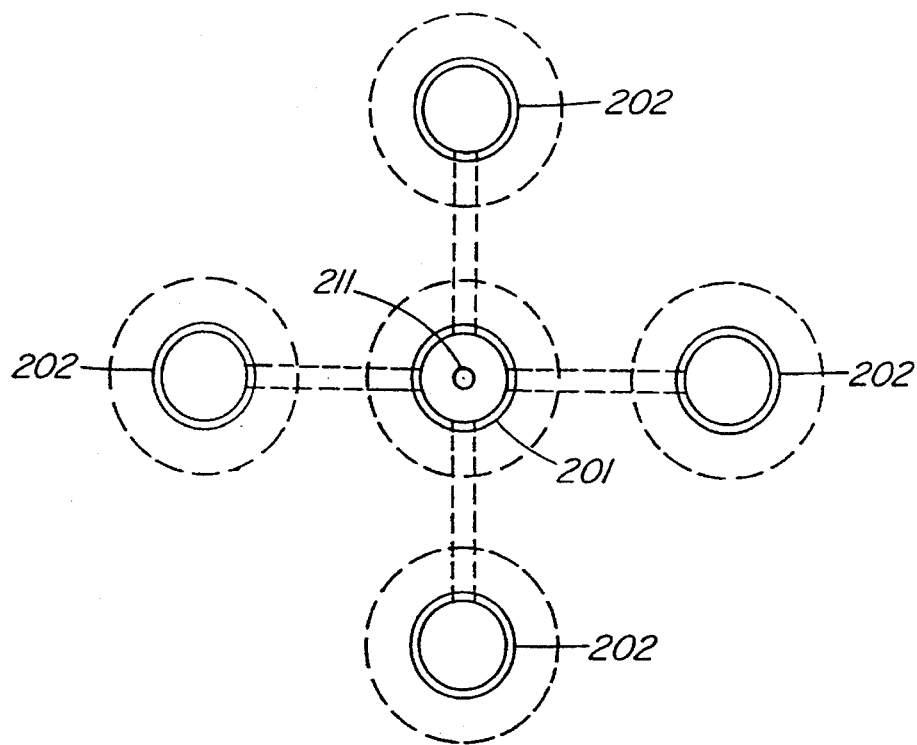
FIG. 3 is a diagrammatic plan view of an animal watering apparatus comprising a central located first casing and a plurality of supplementary casings located around the central casing.

The embodiment of FIGS. 2A and 2B has advantages in that the central casing 201 together with its fluid level control 211 and float 223 can service a number of other like casings 202 positioned about the circumference of casing 201. For example, and as illustrated in FIG. 3, the central casing 201 may be connected to four other secondary casings 202 located about central casing 201 in order to service a greater number of animals. As the animals drink, water is removed from the casing 202 and, therefore, the level of the liquid in casings 201, 202 will drop. As the level drops, the water level control 211 will sense the decrease in height by float 223 and allow liquid to be admitted at a higher temperature from water supply line 210 and, accordingly, to keep the level of water in the casings 201, 202 at the desired height.

Figure 4:
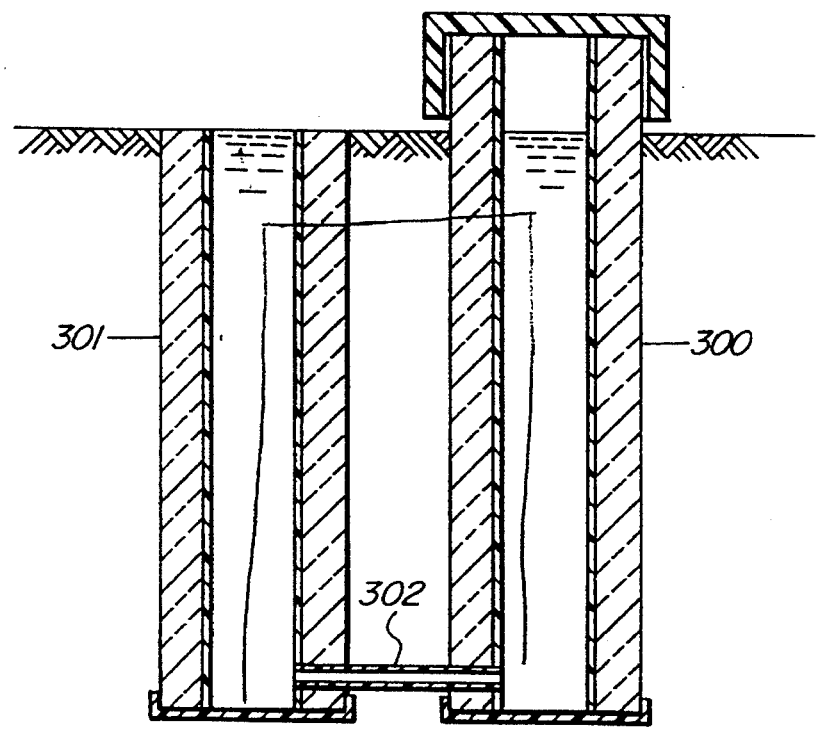
FIG. 4 is a side view of a central and a typical supplementary casing interconnected.

In respect of the embodiment of FIG. 2, it is not necessary, of course, that the two casing 203, 204 be a single piece of cylindrical tubing as illustrated. Rather, the two casings 300, 301 could be independently positioned in the ground with a pipe 302 extending between them at the bottom of the casing 300, 301 as illustrated diagrammatically in FIG. 4. All that is required is for the water provided to casing 300 to be accessible to casing 301 so the casing 301 is able to obtain water from casing 300 when the water level decreases when animals are watering therefrom.

Figure 5:
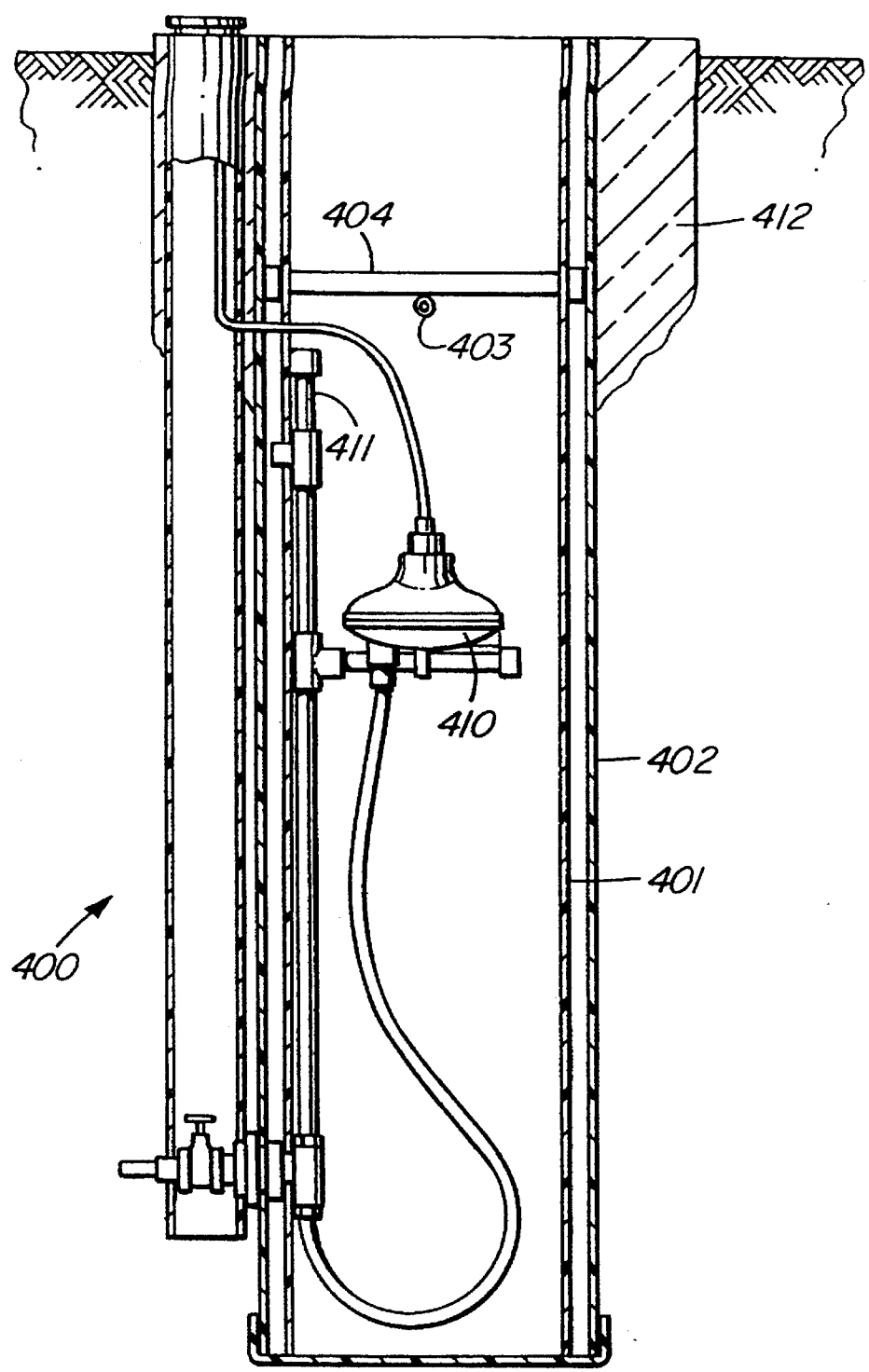
FIG. 5 is a side diagrammatic partially sectional view of a further embodiment of the invention illustrating an inner casing mounted within the central casing.

Yet a further embodiment of the invention is illustrated in FIG. 5. In this embodiment, the animal watering device generally illustrated at 400 is similar to the embodiment of FIG. 1. However, an inner PVC casing 401 is located inside the circumference of casing 402 and a pair of cross-bars 403,404 are mounted within the casing 402 and serve the same purpose as the safety grate 110 in the embodiment of FIG. 1. The liquid level control 410 is mounted on PVC pipe 411 which is connected to the inner casing 401. Urethane foam 412 surrounds the casing 402 throughout its length when the casing 402 is installed in the ground and the liquid level control 410 is adjustably mounted as in the FIG. 1 embodiment to allow water to enter the casing 402 from the water supply line which is located below the frost line of the ground in which the casing 402 is mounted.

A further aspect of the invention relates to the easy removal of the liquid level control 133 (FIG. 1) and its associated piping 111 from the cylindrical casing 101 in which it is mounted. The adaptor 114, rather than being connected to collar 121 by threaded connection 120 is instead replaced with a connection which allows a sliding type fit. O-rings are provided in the fitting to allow sealing when the sliding fit is in its final location. The use of such a connection allows the liquid level control 133 to be removed from and installed with its associated piping from the ground surface after closing the shut-off valve 122, thereby allowing convenient repair or replacement, if necessary, without removing the casing 102.

Specific embodiments of the invention have been described by way of example only. Many modifications will readily occur to those skilled in the art to which the invention relates and such description, therefore, should be taken as illustrative of the invention only and not as limiting its scope as defined in accordance with the accompanying claims.

What is claimed is:

1. An animal watering apparatus comprising a first longitudinal casing, a second longitudinal casing, said first and second longitudinal casings being interconnected as to allow water to circulate between said first and second longitudinal casings, a water supply line to supply water to said first longitudinal casing, a regulator to regulate water emitted from said water supply pipe to said first longitudinal casing, insulation surrounding a substantial portion of the length of said first and said second longitudinal casings and being adapted to extend below the frost line of the ground in which said insulation is positioned, said regulator being located within said first longitudinal casing when said first longitudinal casing is in its operating configuration, said regulator being a liquid level regulator located below the surface of the water in said first longitudinal casing when said first longitudinal casing is in its operating configuration, said liquid level regulator being vertically adjustable within said first longitudinal casing, tubing associated with said liquid level regulator to connect said regulator to said water supply line, a connector associated with said water supply line, said connector including a collar adapted to be slidably and removably inserted in a bracket associated with said water supply line, said liquid level regulator being adapted to be inserted within and removed from said first longitudinal casing.

2. An animal watering apparatus as in claim 1 wherein said liquid level regulator and said tubing are operatively connected to said first longitudinal casing, said regulator being positioned approximately midway between the top and bottom of said first longitudinal casing.

3. Animal watering apparatus as in claim 2 wherein said second casing is positioned parallel to and outside said first longitudinal casing.

4. Animal watering apparatus as in claim 2 wherein said water supply line is located below the frost line of the ground in which it is located and said connector is attached to said water supply line.

5. Animal watering apparatus as in claim 2 wherein said second longitudinal casing is positioned within said first longitudinal casing.

6. Animal watering apparatus as in claim 5 wherein said first casing has a layer of insulating material positioned around the outside of the top of said first casing.

7. Animal watering apparatus as in claim 6 wherein said first casing has an upper opening with an end cap closing said upper opening and a float adapted to float on the surface of the water in said first casing, said float being operatively connected to said regulator.

8. Animal watering apparatus as in claim 7 and further comprising a layer of polyethylene material between said first casing and said ground.

9. Animal watering apparatus as in claim 8 and further comprising a safety grate positioned in said first casing below the water surface in said first casing.

10. Animal watering apparatus as in claim 9 wherein said liquid level regulator is attached to said water supply line with flexible tubing.

11. Animal watering apparatus as in claim 10 wherein said liquid level regulator is axially movable so as to be adjustable within said first casing.

12. Animal watering apparatus as in claim 11 wherein the upper end of said second casing is open.

13. Animal watering apparatus comprising a first longitudinal casing, insulation surrounding said first longitudinal casing, a liquid level control and associated piping located in said first longitudinal casing, a water supply line operable to provide water to said liquid level control, a shutoff valve operably connected to said water supply line, said water supply line and shutoff valve are located below the frost line of the ground in which said water supply line is located, an adjustor to adjust the vertical position of said liquid level control within said first longitudinal casing, and a substantially vertical access passageway to provide access to said shutoff valve from the surface of said ground in which said first longitudinal casing is located.

14. Animal watering apparatus as in claim 13 and further comprising a safety grate in said first casing and wherein said first longitudinal casing has an upper portion and an upper open end, said insulation surrounding said upper portion of said first longitudinal casing about said upper open end thereof.

15. Animal watering device as in claim 14 and further comprising an opening extending downwardly from the ground surface to said fitting whereby the amount of water provided from said water supply line to said liquid level control may be adjusted.

16. Animal watering apparatus as in claim 15 wherein said first longitudinal casing has a wall and said liquid level control is vertically adjustable by sliding said liquid level control on a vertical pipe connected to said wall of said first longitudinal casing.

17. Animal watering apparatus comprising a liquid level regulator, tubing associated with said regulator, a connector associated with said regulator and tubing to connect said liquid level regulator to a water supply line, said connector including a collar adapted to be slidably inserted in a bracket associated with said water supply line, said liquid level regulator being adapted to be inserted within and removed from a casing which is located below the ground surface, said liquid level regulator being adapted to be located below the surface of the water in said casing when said casing is in its operating configuration.

* * * * *